March 2, 1965     W. J. LOHMAN, JR     3,171,924

FUSE CONTROLLED SAFETY DISCONNECT SWITCH

Filed Aug. 7, 1962

INVENTOR.

WILLIAM J. LOHMAN, JR.

BY Richard V. Cifelli,

Attorneys

United States Patent Office 3,171,924
Patented Mar. 2, 1965

3,171,924
FUSE CONTROLLED SAFETY DISCONNECT
SWITCH
William J. Lohman, Jr., Morristown, N.J., assignor to
Chelsea Products, Incorporated, Plainfield, N.J., a corporation of New Jersey
Filed Aug. 7, 1962, Ser. No. 215,326
2 Claims. (Cl. 200—142)

This invention relates to improvements in a safety circuit interrupter or disconnect switch means for use in a circuit of the normally closed type, and operative to break the circuit under surrounding excessively high temperature conditions.

There are many types of electrically actuated devices, desired to be operated under normally closed circuit conditions, wherein such service circuit interrupter or disconnect switch provides a safety factor when excessively high temperature rise occurs in the surrounding atmosphere. An example of a device so operated is a motor driven attic ventilating fan.

For such uses, this invention has for an object to provide in combination with a switch which is biased to open positon, but which can be manually closed, means to releasably hold the switch closed by means of an anchored fusible link or tie which, under excessive surrounding high temperature conditions, will fuse and part, thus releasing the switch for automatic movement to its biased open service circuit interrupting condition.

Another object of this invention is to provide an outlet box or housing within which the switch is mounted, said switch including an actuating member or toggle arm which is biased to switch opening position and is arranged to project externally from a cover or other wall of the outlet box or housing, said member or toggle arm being manipulatable to move the switch to closed position, and then held in such closed position by a fusible link or tie, one end of which is engageable therewith, novel means, also mounted on the cover or other wall of the outlet box or housing, in spaced away relation to said member or toggle arm, being provided to anchor the opposite end of the fusible link or tie.

A further object of the invention is to provide a novel form of fusible link or tie, the anchoring end of which can be easily and quickly detached from the anchoring means, without dismantling the latter or detaching the same from the outlet box or housing with risk of loss of parts thereof, whereby to permit the switch to open and interrupt the service circuit when safe access to the apparatus served by the circuit is desired for purpose of repair or other conditioning thereof.

The above, and other objects of this invention, not at this time more particularly enumerated, will be understood from a reading of the following description of an illustrative embodiment of the invention in connection with the accompanying drawings thereof, in which drawings.

Like characters of reference are employed in the above described views to indicate corresponding parts.

Figure 1:
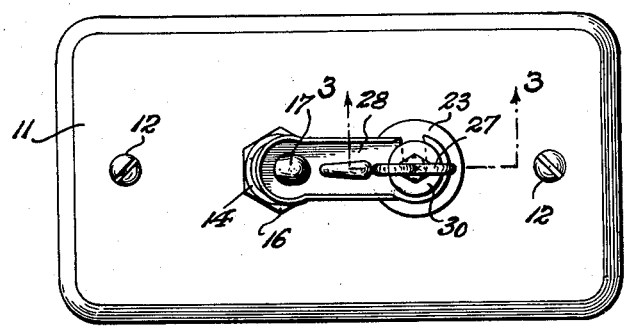
FIG. 1 is a top plan view of an outlet box or housing which contains a switch biased to open position, and showing the external actuating member or toggle arm of the latter held in switch closing position by a fusible link or tie extending from the anchoring means therefor which is externally supported by the outlet box or housing.
Figure 2:
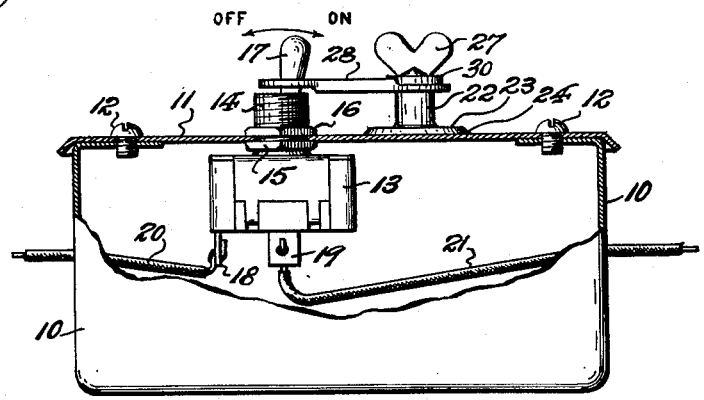
FIG. 2 is a side elevational view in part section of the same.

Referring to the drawings, the reference character 10 indicates the body of an outlet box or housing having a removable cover 11 detachably affixed thereto by fastening screws 12. Contained within the outlet box or housing is an electrical switch 13 of known type wherein the mechanism is spring biased to switch opening condition. This switch is preferably mounted in connection with and so as to be supported by the cover 11 of the outlet box or housing, but it will be understood that it could be mounted in connection with any other wall of the outlet box or housing. To so mount the switch, the body thereof is provided with an externally screw-threaded tubular nipple 14 which is adapted to project outwardly through the cover 11 or other wall, and is secured to the latter by an internal nut 15 and an external nut 16 threaded thereon to respectively engage opposite faces of the cover or other wall, thus affixing the switch thereto. Extending from the switch mechanism through said nipple 14 is a switch actuating member or toggle arm 17, which projects from the outer end of said nipple and exteriorly of the outlet box or housing 10. The switch mechanism and actuating member or toggle arm 17 is spring biased to open switch condition, in manner known to the art. The switch is provided with terminals 18 and 19, to which are respectively connected an ingoing conductor 20 and an outgoing conductor 21, which respectively enter and leave the interior of the outlet box or housing through knock-out openings (not shown) with which selected walls of the outlet box or housing are provided.

Externally mounted on the cover 11 or other wall of the outlet box or housing 10, in suitably spaced away relation to and in alignment with the actuating member or toggle arm 17 of the switch 13, is an upstanding anchor post 22. Preferably this anchor post is provided with a base flange 23 which is suitably secured to the cover 11 or other wall of the outlet box or housing, as e.g. by a welded connection or jointure 24. The anchor post is provided with an upwardly open, internally screw-threaded, axial bore 25. Adapted to enter this bore 25 is the threaded shank 26 of a thumbscrew 27.

Coupled to and between the actuating member or toggle arm 17 of the switch 13 and the anchor post 22 is a fusible link or tie member 28, the same having perforate ends to respectively engage over said actuating member or toggle arm 17 and the shank 26 of the thumbscrew 27. The length of this fusible link or tie member 28 is such that, when so connected between the actuating member or toggle arm 17 and the thmb-screw shank 26, it will retain the former in switch closing position, when manually moved to such position. It will be obvious that in event of abnormal rise in temperature in the vicinity of the switch, the link or tie member will fuse and part, thus releasing restraint of the actuating member or toggle arm 17, and thereby permitting the same and the switch mechanism to move to open or circuit interrupting condition.

Figures 3, 4:
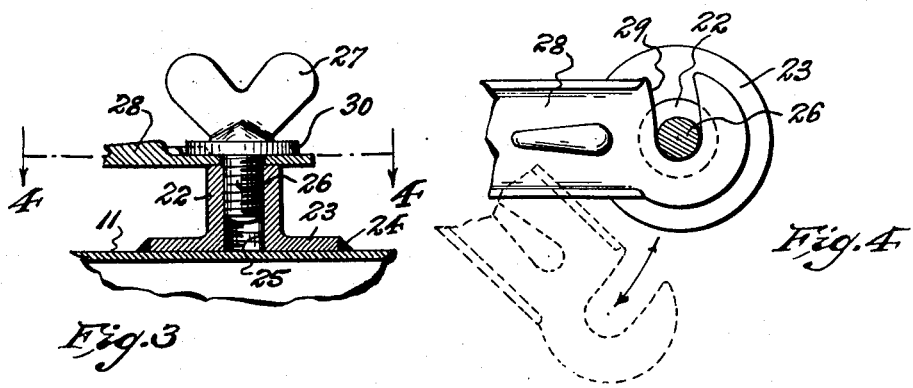
FIG. 3 is an enlarged fragmentary vertical sectional view of the fusible link or tie anchoring means, taken on line 3—3 in FIG. 1.
FIG. 4 is a horizontal sectional view of the same, taken on line 4—4 in FIG. 3.

A more specific object of this invention is to provide a novel form of fusible link or tie member which can be readily and quickly detached from the anchor post 22, without disturbing its initial integral condition, and without necessity for either detaching the anchor post from the outlet box or housing 10, or dismantling the parts thereof, with risk of loss or displacement thereof. To attain this, at least the perforate end of the fusible link or tie member 28, which is adapted to engage the shank 26 of the thumb-screw 27, is provided with a radial, outwardly open gap or passage opening 29, which leads into its thumb-screw shank receiving perforation (see FIG. 4 more particularly). In such connection it is also desirable to provide the thumb-screw 27 with a clamping flange 30 that is adapted to grip the thumb-screw engaged end of the fusible link or tie member between the same and the free end of the anchor post 22, when the thumbscrew is turned home relative to the latter, thus to firmly hold the fusible link or tie member in anchored relation to the anchor post against accidental release therefrom. It will be understood that, by reason of this arrangement, a practical advantage, not heretofore available, will be provided; viz. that by merely loosening the thumb-screw 27, the anchored end of the fusible link or tie member can be swung away from the anchor post so as to be disconnected therefrom (again see FIG. 4). When the fusible link or tie member is thus disconnected from the anchor post 22, its restraint upon the actuating member or toggle arm 17 of switch 13 is released, so that the same can move to switch opening position. This is of real advantage in the event safe access to apparatus served by the switch controlled electric circuit is desired for purpose of repair or other conditioning of said apparatus. After the desired repair or other conditioning of the apparatus is accomplished, the fusible link or tie member can be quickly returned to its switch closing connection with the anchor post.

Having now described my invention, I claim:

1. In combination with a support, a switch biased to circuit interrupting condition and having an actuating member manipulatable to effect its circuit closing condition, and means to releasably hold the actuating member in position to effect said circuit closing condition, said means comprising an anchor post mounted on the support in spaced away and aligned relation to said actuating member, the anchor post having an internally screw-threaded bore, a thumb-screw engaged in said bore, and a fusible link having perforate ends to respectively engage the actuating member and the thumb-screw of the anchor post, the thumb-screw engaging perforate end of said link having a radial outwardly open passage through which the thumb-screw can pass into and out of its perforation, whereby to engage and disengage the anchor post when the link is swung about the actuating member as a pivot.

2. In combination with a support, a switch biased to circuit interrupting condition and having an actuating member manipulatable to effect its circuit closing condition, and means to releasably hold the actuating member in position to effect said circuit closing condition, said means comprising an anchor post mounted on the support is spaced away and aligned relation to said actuating member, the anchor post having an internally screw-threaded bore, a thumb-screw engaged in said bore, and a fusible link having perforate ends to respectively engage the actuating member and the thumb-screw of the anchor post, the thumb-screw engaging perforate end of said link having a radial outwardly open passage through which the thumb-screw can pass into and out of its perforation, whereby to engage and disengage the anchor post when the link is swung about the actuating member as a pivot and the thumb-screw having a clamping flange to grip the engaged end of the link between the same and the anchor post when said thumb-screw is turned home in the latter.

References Cited by the Examiner
UNITED STATES PATENTS

| | | | |
|---|---|---|---|
| 1,321,488 | 11/19 | Starrett | 200—133 |
| 1,857,097 | 5/32 | Glowacki | 200—135 |
| 2,817,733 | 12/57 | Pinkard et al. | 200—142 |

BERNARD A. GILHEANY, *Primary Examiner*.